(No Model.)

A. HIRSCHEL.
TOOL FOR PEELING AND SCRAPING VEGETABLES.

No. 414,908. Patented Nov. 12, 1889.

WITNESSES:
F. McArdle
C. Sedgwick

INVENTOR:
A. Hirschel
BY Munn & Co.
ATTORNEYS.

UNITED STATES PATENT OFFICE.

AUGUST HIRSCHEL, OF HACKENSACK, NEW JERSEY.

TOOL FOR PEELING OR SCRAPING VEGETABLES.

SPECIFICATION forming part of Letters Patent No. 414,908, dated November 12, 1889.

Application filed November 23, 1888. Serial No. 291,651. (No model.)

*To all whom it may concern:*

Be it known that I, AUGUST HIRSCHEL, of Hackensack, in the county of Bergen and State of New Jersey, have invented a new and useful Improvement in Tools for Peeling or Scraping and Preparing Vegetables, of which the following is a full, clear, and exact description.

This invention consists in a hand-tool for peeling or scraping vegetables, which has combined with it means for slicing and grating uses as well, thereby adding to the convenience of the peeler or scraper for kitchen and culinary purposes, substantially as hereinafter described, and pointed out in the claims.

The tool will be found especially useful for peeling potatoes, turnips, or apples, for scraping carrots, for slicing potatoes or other vegetables, and for grating them or other articles.

Reference is to be had to the accompanying drawings, forming a part of this specification, in which similar letters of reference indicate corresponding parts in all the figures.

Figure 1:
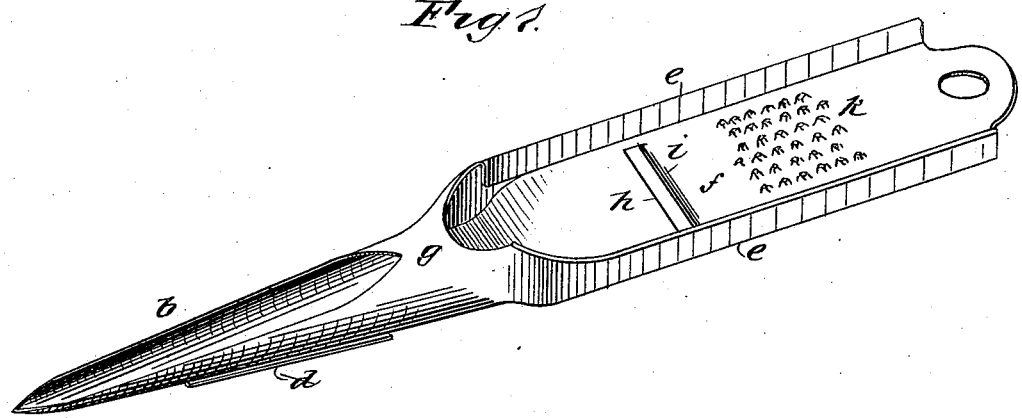
Figure 2:
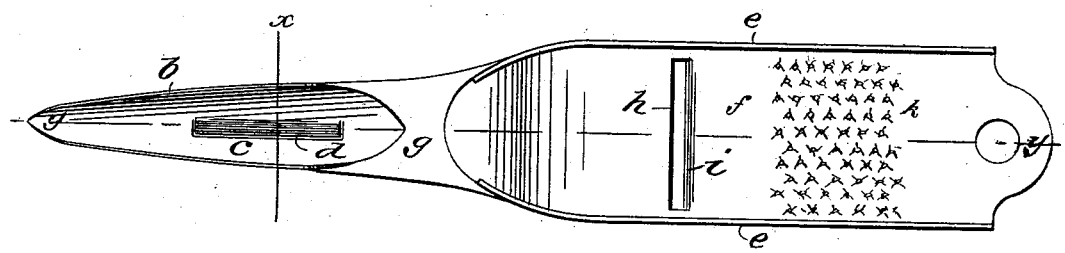
Figure 3:
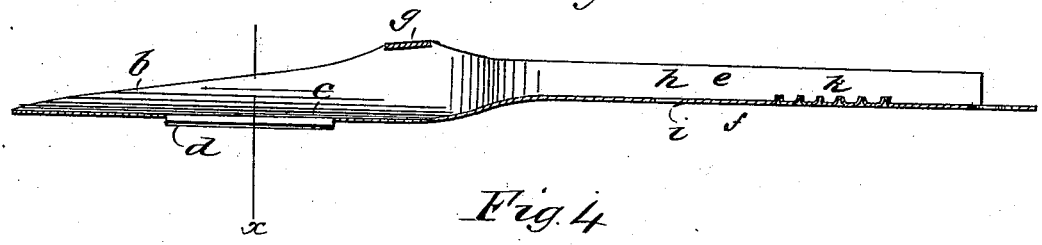
Figure 4:
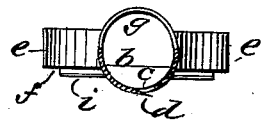

Figure 1 represents a view in perspective of my improved implement. Fig. 2 is a face view of the same, Fig. 3, a longitudinal section thereof upon the line $y$ $y$ in Fig. 2, and Fig. 4 a transverse section upon the line $x$ $x$ in Figs. 2 and 3.

The tool, which is made of tinned hard metal, is constructed with a pointed coring-scoop $b$ at its one end, with a longitudinal incision $c$, having the incised metal slightly bent outward and sharpened to form a knife or cutter $d$. This end part of the tool, when the remainder of the latter is used as a handle to work it by, serves, by holding the vegetable in the other hand, to peel or scrape the vegetable by suitably applying or manipulating the exterior concave surface of the scoop and knife $d$ to or over the cuticle to be removed—as, for instance, to peel a potato, a turnip, or an apple; or it may be used as a scraper for carrots. Its pointed extremity serves to remove the eyes from potatoes, or the scoop may be used for coring apples and for various other purposes. The body and opposite end portion of the tool is of a flattened construction, the same being in the form of a flat spout $f$, having turned-up sides $e$, and closed over the rear end of the scoop, as at $g$, to strengthen the implement. This body part $f$ has a transverse slot $h$ in it, with its one longitudinal wall bent slightly outward to form a second knife or cutter $i$, which may be used for slicing potatoes by drawing the vegetable repeatedly over the back of the body $f$ and against and past the cutter $i$, whereby the vegetable will be cut up into very thin slices.

In rear again of the cutter $i$ the body portion $f$ is perforated or constructed to form a grater $k$, for reducing the vegetable into still finer particles when required, or, in other words, for grating it as nutmegs are grated, and the same may be used for grating purposes generally.

Having thus described my invention, what I claim as new, and desire to secure by Letters Patent, is—

1. A tool for peeling or scraping and preparing vegetables, comprising the coring-scoop portion $b$, having a knife $d$, and the flattened spout-like portion $f$, having a transverse slot $h$, and constructed to form a cutter $i$ on its back, substantially as specified.

2. As a new article of manufacture, the within-described tool for peeling or scraping and preparing vegetables, the same being composed of an end-coring scoop portion $b$, having an exterior peeling or scraping knife $d$, and of a body and opposite end flattened spout-like portion $f$, having a transverse slot $h$, with an exterior slicing-cutter $i$ along the one side of said slot, and a perforated grating surface or portion $k$, as set forth.

AUGUST HIRSCHEL.

Witnesses:
    FREDERICK P. VAN WITERING,
    CHARLES KOST, Jr.